(No Model.)
L. W. HEMP.
COMBINED MINNOW BUCKET AND TRAP.
No. 504,526. Patented Sept. 5, 1893.
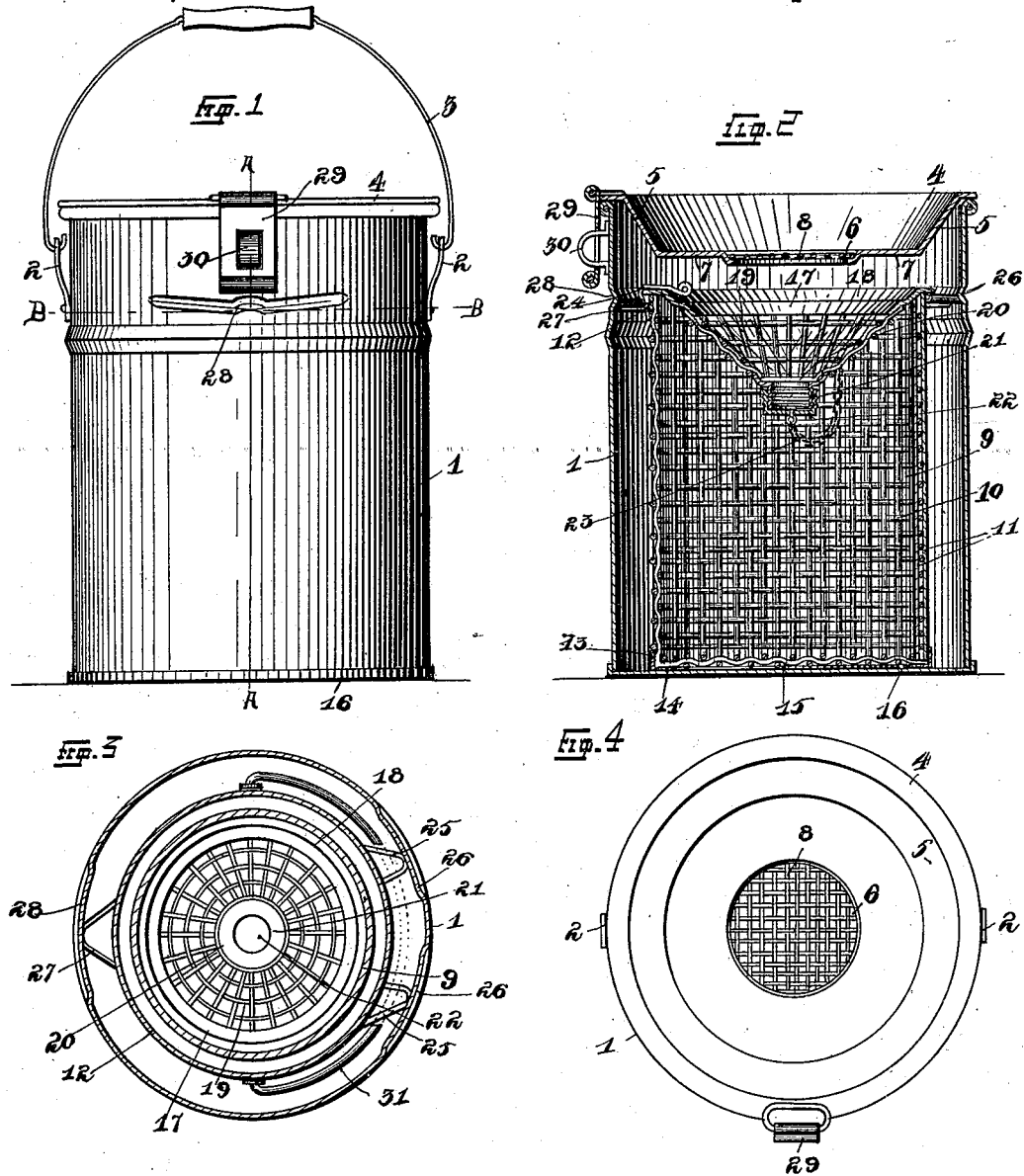
Witnesses,
Alfred A. Fisher
Herbert A. Robinson
Inventor,
Lewis W. Hemp
By Higdon Higdon & Longan, Attys

UNITED STATES PATENT OFFICE.

LEWIS W. HEMP, OF ST. LOUIS, MISSOURI.

COMBINED MINNOW BUCKET AND TRAP.

SPECIFICATION forming part of Letters Patent No. 504,526, dated September 5, 1893.

Application filed February 13, 1893. Serial No. 462,150. (No model.)

*To all whom it may concern:*

Be it known that I, LEWIS W. HEMP, of the city of St. Louis and State of Missouri, have invented certain new and useful Improvements in a Combined Minnow Bucket and Trap, of which the following is a full, clear, and exact description, reference being had to the accompanying drawings, forming a part hereof.

My invention relates to improvements in a combined minnow bucket and trap and consists in the novel arrangement and combination of parts, as will be more fully hereinafter described and designated in the claims.

The object of my invention is to construct an improvement in this line of manufacture.

In the drawings: Figure 1 is a detail elevation of my complete invention. Fig. 2 is a vertical detail sectional view of the same taken on a line A—A in Fig. 1. Fig. 3 is a detail plan sectional view taken on a line B—B in Fig. 1. Fig. 4 is a detail top plan view of the device.

Referring to the drawings: 1 indicates a bucket having substantially the same exterior outlines as buckets ordinarily constructed, and is provided with lugs 2, to which a bow-handle 3 is secured. The lid 4 of the bucket has downwardly and inwardly converging walls 5 and a bottom depressed below the plane of the upper edges of said walls to form a pan or receptacle thereat, and is provided with an opening 6 in the center of the bottom 7 of said lid 5, a reticulated wire screen 8 being secured over said opening 6 as shown in Fig. 2.

Removably secured within the outer bucket 1 is an interior trap bucket 9 having reticulated top, bottom, and sides. The sides 10 are circular in plan view and have their adjacent ends joined between two vertical strips 11 made of tin, as shown in Fig. 2, provided around the upper and lower edges with annular strips 12 and 13 respectively, the strip 13 having a horizontal inwardly projecting annular flange 14 which is adapted to engage under the reticulate bottom 15 and rest upon the bottom 16 of the bucket 1.

Hinged to the strip 12 at one side is the conical top 17 of the inner bucket 9, said top having an annular rim 18 downwardly and inwardly converging and to which is secured a reticulate screen 19 forming a tapering or flaring entrance to the top of said bucket 9. An apexial opening 20 in said screen is surrounded by a downwardly projecting and exteriorly screw threaded nozzle 21 over which is adapted to be adjusted a screw threaded closing cap 22. A conical top 17 projects within the open upper end of the trap-bucket, and the apexial opening 20, the nozzle 21 and the chained-cap 22 are all located within said trap-bucket. Said cap 22 is secured by a chain 23 to prevent the same from being disengaged from the bucket, the free end of said chain 23 being secured to the inner side of the top at some point in its surface.

A suitable catch 24 is pivotally secured at one end to the rim 12 and adapted to engage over the rim 18 to hold the top of said bucket 9 in position when the same is being used as a trap. Projecting from said rim 12 upon one side of the trap bucket 9 in a horizontal plane common to both are two V-shaped ears 25 preferably made of wire and adapted to engage in indented portions 26 in the periphery of the outer bucket 1 and upon the side of said bucket opposite to said ears 25 is a single larger ear 27 of similar form and construction to the ears 25 and adapted to engage in an indented portion 28 in the periphery of the bucket 1.

As before stated, the lid 4 of the outer bucket 1 is hinged and for its securance I have provided a jointed hasp 29 secured to said lid and adapted to fit over a staple 30 secured to the side wall of the bucket.

The inner bucket 9 is provided with a handle 31 by means of which the same may be turned in order that the ears 25 and 27 will be out of engagement with the portions 26 and 28 and allow the removal of said inner bucket 49 from the outer bucket 1.

When used as a trap the inner bucket 9 is removed from the outer bucket 1, the lid of same opened and the cap 22 unscrewed from its connection with the nozzle 21 and allowed to hang depending within the bucket 9. The inner bucket is then set in the stream of water and under the surface of same, attractive bait placed within the bucket 9, and the small minnows attracted by the bait will enter through the nozzle 21, and supposedly remain in said bucket, thus causing it to act as a trap.

The bucket is then removed from the water after a number of minnows have been caught, and the lid opened and the cap 22 screwed over the nozzle 21, thus preventing their escaping, unless they are small enough to pass through the openings in the screen forming the sides and top. The inner trap bucket 9 is then placed within the outer bucket 1 and the same turned enough to engage the ears 25 and 27 in the portions 26 and 28, thus securing the trap within the outer bucket.

It will be observed that the trap-bucket is readily detachable from the outer bucket, and is secured therein by a revoluble movement, and also detachable therefrom by a similar movement. The minnows are now ready for transportation, and the reticulate portion 8 in the bottom 7 of the lid 4 allows the free circulation of air within the outer bucket and also of lid, in order that the bait will not die.

The above description and reference to the drawings will give a clear idea of what I have contemplated in my invention and as its advantages are apparent, I will not give any further details.

Having fully described my invention, what I claim is—

1. The improved minnow bucket or trap, constructed with an outer bucket 1, a cylindrical trap-bucket 9 having reticulated sides, a conical top having reticulated sides which converge inwardly to form a flaring entrance to said trap bucket, said top having an apexial opening 20, a threaded nozzle 21 applied to said opening and detachable therefrom upon the interior of said trap-bucket, means for securing said cap to said top when said cap is removed from said nozzle, said top hinged to the upper end of said trap-bucket, and a pivoted-catch for securing said top, substantially as herein specified.

2. The improved minnow bucket or trap, constructed with an outer bucket 1 having indentations 26 upon its interior adjacent its upper end, an indentation 28 located opposite said indentations 26 the inner trap bucket having a conical top projecting within said trap-bucket and hinged thereto, said top having a capped apexial-opening and forming a flaring entrance to said trap-bucket, a rim 12 applied to the upper edge of said trap-bucket, two V-shaped ears 25 projecting in a common horizontal plane from said rim at one side of said trap-bucket and detachably engaging the indentations 26 of the outer bucket, a single larger ear 27 having a form similar to that of said ears 25 and detachably engaging the indentation 28 in the outer bucket, and a catch 24 pivotally secured at one end to said rim adjacent said larger ear 27 and constructed to engage over the edge of said top to hold the same in position when used as a trap, substantially as specified.

In testimony whereof I affix my signature in presence of two witnesses.

LEWIS W. HEMP.

Witnesses:
HERBERT S. ROBINSON,
ALFRED EICKS.